United States Patent Office 2,949,353
Patented Aug. 16, 1960

2,949,353

CHLOROPHENOXY ACETATES OF IODOSOBENZENE AND HERBICIDAL COMPOSITIONS AND METHODS EMPLOYING THE SAME

Robert E. Miller, Kettering, Ohio, assignor to Monsanto Chemical Company, St. Louis, Mo., a corporation of Delaware No Drawing. Filed Aug. 9, 1957, Ser. No. 677,218

8 Claims. (Cl. 71—2.6)

The present invention relates to esters of iodosobenzene and to herbicidal compositions comprising the same. More particularly the invention provides (chlorophenoxy)acetates of iodosobenzene as new compounds and the method of producing the same. The invention also provides herbicidal compositions comprising the new esters as the essential effective ingredients.

I prepare the iodosobenzene (chlorophenoxy)acetates in good yields by contacting iodosobenzene with an ar-chlorosubstituted phenoxyacetic acid substantially according to the scheme

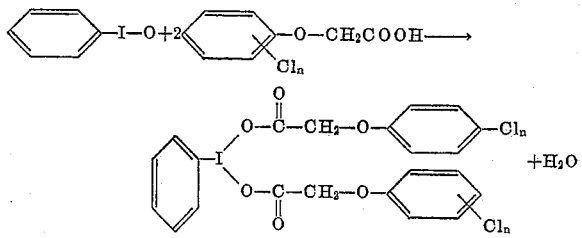

in which $n$ is an integer of from 1 to 3.

Reaction of the iodosobenzene with the ar-chlorophenoxy-acetic acid is readily effected by mixing the iodosobenzene with said acid at ordinary or increased temperatures and allowing the resulting reaction mixture to stand until formation of the iodosobenzene ar-substituted phenoxyacetate has occurred. While depending upon the reaction temperature employed as well as upon the quantities used and the degree of agitation, the reaction may be effected in the presence or absence of an inert diluent or solvent, generally I prefer to operate by dissolving one of the reactants in an inert solvent and then adding the other reactant to the resulting solution. As solvents or diluents which are useful for the present purpose there may be mentioned methanol, ethanol, ethyl or isopropyl ether, benzene, toluene, xylene, dioxane, hexane, etc. The reaction may be effected by allowing the reaction mixture of iodosobenzene and ar-(chlorophenoxy)acetic acid to stand at ordinary room temperature; however, in order to effect completion of the reaction within a shorter period of time, heating at, say, a temperature of 50° C.–150° C. depending upon the nature of the diluent as well as the nature of the ar-chlorophenoxyacetic acid may be used. The iodosobenzene esters of the ar-chlorophenoxyacetic acids are readily crystallizable solids which separate from the cooled reaction mixture upon completion of the reaction.

According to the invention iodosobenzene thus reacts with 2-, 3- or 4-chlorophenoxyacetic acid to give either the 2-chlorophenoxyacetate or the 3-chlorophenoxyacetate or the 4-chlorophenoxyacetate of iodosobenzene; with 2,3-, or 2,4-, or 3,4-, or 3,5-, or 2,6-dichlorophenoxyacetic acid, iodosobenzene gives the corresponding 2,3- 2,4-, 3,4-, 3,5-, or 2,6-dichlorophenoxyacetates of iodosobenzene. Similarly the ar-trichlorophenoxyacetates of iodosobenzene are prepared by the reaction of iodosobenzene with 2,4,5-, or 4,5,6-, or 2,4,6-trichlorophenoxyacetic acid to give the corresponding 2,4,5-, or 4,5,6-, or 3,5,6-, or 2,4,6-trichlorophenoxyacetates of iodosobenzene.

The present iodosobenzene ar-chlorophenoxyacetates are stable, well defined crystalline compounds which may be advantageously employed for a variety of commercial and industrial purposes, e.g., as biological toxicants, as oxidizing agents, and as lubricant additives. They are most advantageously employed, however, as foliage contact and preemergent herbicides.

Herbicidal compositions containing the present iodosobenzene ar-chloro-substituted phenoxyacetates may be applied to the foliage of growing plants or to soils and other plant growth media for the prevention of seed germination. Because the present compounds are effective in very dilute concentrations, for example in concentrations of as low as 0.001%, they are preferably applied in an admixture with inert carriers, which may be liquids or dusts. When employed with liquid carriers they are advantageously employed in aqueous emulsions. For preparation of the liquid emulsions the present compounds are generally dissolved in an inert organic liquid which is a solvent therefor and the resulting solution is added to water in the presence of an emulsifying agent to form an oil-in-water emulsion. Emulsifying agents which may be employed are those customarily used in the art for emulsions or dispersions. Examples thereof are the higher alkylbenzenesulfonates, polyalkylene glycol ethers, the higher alkyl sulfosuccinates, etc. The word "oil" is here used to designate any organic liquid which is insoluble in water or immiscible therewith.

The emulsions may be used to prevent the growth of undesired plants in media which normally support plant growth, while permitting the growth of desired plants. Selective herbicidal action is also evidenced when the present esters are incorporated with finely comminuted inert solids such as pumice, talc or bentonite and applied either to the plants or to plant growth media. The present esters may also be used for prevention of plant growth in areas which are to be kept clear of plants by admixing the new esters with customarily employed temporary surfacing materials, e.g., oils, cinders, etc.

The present iodosobenzene ar-chlorophenoxyacetates are of interest in that toxicity to various plant species depends upon the concentration at which the ar-chlorophenoxyacetate is employed. Thus at high concentrations, e.g., at concentrations of 1.0% phytotoxicity to all plant life is demonstrated upon application to foliage. As the concentration is decreased, however, phytotoxic effect on narrow-leaf plants is diminished so that at, say, an 0.5% concentration the narrow-leaf plants are only moderately affected, whereas the broad-leaf plants are killed. At a concentration which is considerably lower, e.g., at an 0.005% concentration no phytotoxic effect is demonstrated upon the narrow-leaf plants whereas the broad-leafed plants are killed. Selective preemergent effect is also demonstrated at certain concentrations of the iodosobenzene ar-chlorophenoxyacetates. When used with comparatively large concentrations, e.g., at 25 lbs./acre, emergence of not only the broad-leaf plants such as beet, cotton and mustard is substantially suppressed but also of some of the narrow-leaf plants. At a concentration of 5 lbs./acre, there is further evidence of selective activity, e.g., germination of the broad-leafed plants such as morning glory, radish, sugar beet and pigweed is entirely suppressed whereas only very slight effect is noted on the germination of wild oats, rye grass and corn. Similar results are obtained when only a fraction of this amount, i.e., 2 lb./acre is used. At this very low concentration, corn is not at all affected, whereas pigweed and radish are completely suppressed.

The invention is further illustrated, but not limited by the following examples.

Example 1

2,4-dichlorophenoxyacetic acid (24.6 g., 0.1 mole) was dissolved in a mixture of benzene and methanol, 8.0 g. (0.4 mole) of iodosobenzene was added to the resulting solution, and the whole was heated on the steam bath for about ten minutes. The reaction mixture was then allowed to cool and the product which crystallized therefrom was filtered to give 24.6 g. (100% theoretical yield) of the substantially pure iodosobenzene bis(2,4-dichlorophenoxyacetate), M.P. 101.5–103° C., analyzing 40.96% carbon as against 41.20% the calculated value for $C_{22}H_{14}O_6Cl_4I$.

Example 2

This example shows the valuation of the iodosobenzene bis(2,4-dichlorophenoxyacetate) of Example 1 as a pre-emergent herbicide. Briefly, the test chemical was applied in spray form to soil seeded to representative grass and broad-leafed plants. Aluminum pans 13" x 9" x 2" were filled with top-soil which had been screened through a ½" wire mesh and treated with methyl bromide soil fumigant to rid the soil of unwanted microorganisms and seeds. The soil was then compacted to within ⅜" of the pan top and planted with from 3 to 20 seeds each of the following: wild oats, foxtail, brome grass, rye grass, barnyard grass, crab grass, field bindweed, radish, sugar beet, corn, cotton, pigweed, morning glory and buckwheat. The grass seeds were scattered randomly over two-thirds of the soil surface, 5 corn seeds were planted down the center of the pan and the broad-leafed seeds were scattered over the remaining ⅓ area of the pan. The seeds were then covered with ⅜" of the prepared soil mixture and the pan was leveled. The planted pans were placed in the exhaust hood and sprayed first with 30 cc. of an aqueous solution containing 1% by weight of a liquid fertilizer and 0.1% of octamethyl pyrophosphoramide. The fertilizer furnishes a uniform nutrition level and the amide prevents insect injury from aphids and mites. The pan was next sprayed with 30 cc. of an acetone solution containing 0.12 g. of the iodosobenzene bis(2,4-dichlorophenoxyacetate). This corresponded to 5 lbs. of the test chemical per acre. After spraying, the pans were placed in ½" of water and allowed to absorb moisture through the perforated bottom until the soil surface was about one-half moist. The pans were then transferred to a wet sand bench in the greenhouse. Ten days after application of the test chemical the following results were observed: No germination was evidenced for morning glory, radish, sugar beet, foxtail, field bindweed and pigweed; there was only slight germination of brome grass, cotton, barnyard grass and crab grass; and moderately good (though not complete) germination of wild oats, rye grass, buckwheat and corn.

Example 3

The evaluation procedure of Example 2 was repeated except that the iodosobenzene bis(2,4-dichlorphenoxyacetate) was employed at a concentration of 2 lb./acre, i.e., there was employed 30 cc. of an acetone solution of 0.016 g. of the iodosobenzene ester. Observation of the planted and sprayed pans at the end of the ten day period again showed complete suppression of radish and pigweed. At this concentration no effect on cotton and corn was evidenced.

Example 4

This example describes foliage spray tests conducted with the iodosobenzene bis(2,4-dichlorophenoxyacetate) of Example 1. A pan was planted as in Example 2 except that the iodosobenzene ester was not applied previous to germination; instead, the planted pan was kept in the greenhouse until the germinated seedlings were 21 days old. At the end of that time the seedlings were sprayed with 15 cc. of an emulsion containing an 0.5% concentration of the iodosobenzene ester. This emulsion had been prepared by adding a cyclohexanone solution of the calculated amount of the iodosobenzene ester to water in the presence of about 0.2% by weight, based on the weight of the total emulsion, of an emulsifier known to the trade as "Emulsifier L" (a mixture of a polyoxalkylene derivative and an alkylbenzenesulfonate). The sprayed plants were then maintained in the greenhouse under ordinary conditions of sunlight and watering for 14 days. Observation of the sprayed plants at the end of that time showed that all of the broad-leafed plants had been killed and the grass severely injured.

Example 5

The evaluation procedure of Example 4 was repeated except that the iodosobenzene bis(2,4-dichlorophenoxyacetate) was employed at only an 0.005% concentration. Observation of the sprayed plants at the end of that time showed severe injury to the broad-leafed plants and no phytotoxic effect on either corn or the grasses.

The herbicidal activity of the iodosobenzene bis(2,4-dichlorophenoxyacetate) of the above examples is also demonstrated by other iodosobenzene ar-chlorophenoxyacetates having from one to three chlorine substituents in the aromatic ring. Thus, instead of using the iodosobenzene bis(2,4-dichlorophenoxyacetate), similar results are obtained with, say, either iodosobenzene bis(4-chlorophenoxyacetate), iodosobenzene bis(3,5-dichlorophenoxyacetate) or iodosobenzene bis(3,4,5-trichlorophenoxyacetate). Excellent discriminatory phytotoxicity is demonstrated by the iodosobenzene ar-chloro-substituted phenoxyacetates generally. The present iodosobenzene esters may be used with marked success for the chemical weeding of agricultural crops. For this purpose they may be applied with particular facility at the low concentrations required by employing emulsions of the iodosobenzene compounds formulated as described above. They may be used alone, or if desired, they may be applied to soils or to growing plants in combination with other agricultural compositions. Further modifications and applications will be apparent to those skilled in the art.

What I claim is:

1. An iodosobenzene ester having the formula

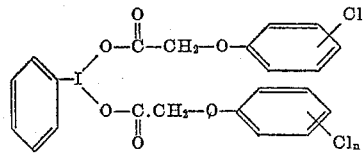

in which $n$ is an integer of from 1 to 3.

2. Iodosobenzene bis(2,4-dichlorophenoxyacetate).

3. A herbicidal composition comprising an oil-in-water emulsion of an iodosobenzene of the formula

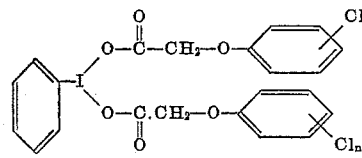

in which $n$ is an integer of from 1 to 3.

4. A herbicidal composition comprising an inert carrier and iodosobenzene bis(2,4-dichlorophenoxyacetate).

5. The method of destroying undesirable plants which comprises applying to the plants a phytotoxic quantity of a herbicidal composition comprising as the essential effective ingredient an iodosobenzene ester of the formula

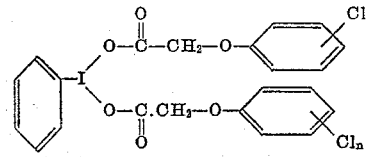

in which $n$ is an integer of from 1 to 3.

6. The method of destroying undesirable plants which comprises applying to the plants a phytotoxic quantity of a herbicidal composition comprising iodosobenzene bis (2,4-dichlorophenoxyacetate) as the essential effective ingredient.

7. The method of preventing plant growth which comprises applying to soils normally supporting said growth a phytotoxic quantity of a herbicidal composition comprising as the essential effective ingredient an iodosobenzene ar-chlorophenoxyacetate of the formula

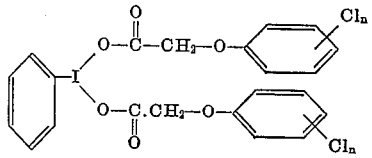

in which $n$ is an integer of from 1 to 3.

8. The method of preventing plant growth which comprises applying to soils normally supporting said growth a phytotoxic quantity of a herbicidal composition comprising iodosobenzene bis(2,4-dichlorophenoxyacetate) as the essential effective ingredient.

References Cited in the file of this patent

UNITED STATES PATENTS

| | | |
|---|---|---|
| 2,322,761 | Lontz | June 29, 1943 |
| 2,390,941 | Jones | Dec. 11, 1945 |
| 2,396,513 | Jones | Mar. 12, 1946 |

OTHER REFERENCES

Sidgwick: Chemical Elements and Their Compounds, vol. II, p. 1250 (1950).